US007290262B2

(12) United States Patent
Blizniak et al.

(10) Patent No.: US 7,290,262 B2
(45) Date of Patent: Oct. 30, 2007

(54) METHOD AND APPARATUS FOR DYNAMICALLY DETERMINING INFORMATION FOR DEPLOYING A WEB SERVICE

(75) Inventors: Paul K. Blizniak, Garner, NC (US); Bryan A. Hogan, Cary, NC (US); Mark Douglas Weitzel, Durham, NC (US)

(73) Assignee: International Business Machine Corporation, Armonk, NY (US)

( * ) Notice: Subject to any disclaimer, the term of this patent is extended or adjusted under 35 U.S.C. 154(b) by 889 days.

(21) Appl. No.: 10/151,768

(22) Filed: May 21, 2002

(65) Prior Publication Data

US 2003/0220993 A1    Nov. 27, 2003

(51) Int. Cl.
    *G06F 3/00*        (2006.01)
(52) U.S. Cl. .................................... 719/310
(58) Field of Classification Search ............ 719/310
    See application file for complete search history.

(56) References Cited

U.S. PATENT DOCUMENTS

| | | | |
|---|---|---|---|
| 5,754,858 A | 5/1998 | Broman et al. ............. 395/701 |
| 5,835,712 A * | 11/1998 | DuFresne ................... 709/203 |
| 5,931,900 A | 8/1999 | Notani et al. .............. 709/201 |
| 5,995,945 A | 11/1999 | Notani et al. ................ 705/28 |
| 6,044,409 A * | 3/2000 | Lim et al. .................... 719/315 |
| 6,128,611 A | 10/2000 | Doan et al. .................... 707/4 |
| 6,128,619 A | 10/2000 | Fogarasi et al. ............ 707/102 |
| 6,157,953 A | 12/2000 | Chang et al. ................ 709/225 |
| 6,182,136 B1 | 1/2001 | Ramanathan et al. ....... 709/224 |
| 6,209,018 B1 | 3/2001 | Ben-Shachar et al. ...... 709/105 |
| 6,219,700 B1 | 4/2001 | Chang et al. ................ 709/222 |
| 6,222,533 B1 | 4/2001 | Notani et al. ............... 345/329 |
| 6,266,666 B1 | 7/2001 | Ireland et al. ................. 707/10 |
| 6,286,047 B1 | 9/2001 | Ramanathan et al. ....... 709/224 |
| 6,792,575 B1 * | 9/2004 | Samaniego et al. .......... 715/513 |
| 6,798,751 B1 * | 9/2004 | Voit et al. .................... 370/252 |
| 6,925,631 B2 * | 8/2005 | Golden ........................ 717/115 |
| 2001/0010053 A1 | 7/2001 | Ben-Shachar et al. ...... 709/105 |
| 2002/0032730 A1 * | 3/2002 | Amit et al. .................. 709/204 |
| 2002/0178254 A1 * | 11/2002 | Brittenham et al. ......... 709/224 |
| 2003/0005181 A1 * | 1/2003 | Bau et al. .................... 709/330 |

OTHER PUBLICATIONS

Print Issues and Insights: Web Services the Microsoft Way, Machiraju V. Sahai A.

(Continued)

*Primary Examiner*—William Thomson
*Assistant Examiner*—LeChi Truong
(74) *Attorney, Agent, or Firm*—Synnestvedt & Lechner LLP; Martin McKinley

(57) ABSTRACT

The invention is a method and apparatus that, upon receipt of a Web service deployment artifact, attempts to determine a deployment strategy for the Web service and deploy the Web service using that strategy. The invention stores a plurality of deployment strategies and corresponding deployment identifiers. When it receives a deployment artifact, it checks if it is a recognized deployment descriptor object that is registered with it as a deployment identifier, and, if so, runs the corresponding deployment strategy to deploy the Web service. If this scheme does not work, it tries a second scheme in which it assumes that the artifact is a URL or URI character string and attempts to parse the artifact to determine the extension of the provided resource and use it as its deployment identifier. If it determines and recognizes the extension, it attempts to deploy the Web service utilizing the deployment strategy that it has registered as corresponding to that extension/identifier. If that is unsuccessful, it attempts to parse the provided resource to create a Document Object Model (DOM) and then queries the DOM's namespace for a deployment strategy.

5 Claims, 2 Drawing Sheets

OTHER PUBLICATIONS

Middleware Design Issues for application Management in Heterogeneous Networks.Tian Y; Frank S; Tsaoussidis V; Badr H, Proceedings IEEE International Conference on Networks 2000, Networking Trends and Challenges in the New Millennium, pp. 125-130, Sep. 5-8, 2000.

Components and Web Services, Szyperski C, Software Development, vol. 9, No. 8, pp. 57-58, Aug. 2001.

International Business Machines Research Disclosure, Apr. 1999, 420136,Client Application for Integrating a Development Environment with a Web Distributed Authoring (WebDAV) Server.

International Business Machines Research Disclosure, Dec. 1999, 428145, Object Format for Parts Management of Dynamic Web Contens Creation System.

Journal Paper, Inspec Abstract No. C2001-12-5620W-132, Har, H., Web Service Technology and Fujitsu's Strategy, Fujitsu, vol. 52, No. 5, p. 412-16, 2001.

Conference Paper, Inspec. Abstract No. B2000-08-6210L-138-C2000-08-7210N-118, Vaupel, J., Implicit and Explicit Services and their Implementation through an Active Services Architecture, Proceedings of International conference on Virtual Systems and Multimedia VSMM '99 p. xiv+550, 417-27, 1999.

Journal Paper, Inspec Abstract No. B2001-12-6210L-219-5620W-130, Mitsuhama, G., Wako, J., Fundamental Concept for Web Computing, Fujitsu, vol. 52, No. 5, p. 400-5, 2001.

A Peer-to-Peer Service Interface for Manageability, pp. 45-50, Mar. 23, 2001, 50 pp.

* cited by examiner

METHOD AND APPARATUS FOR DYNAMICALLY DETERMINING INFORMATION FOR DEPLOYING A WEB SERVICE

FIELD OF THE INVENTION

The invention pertains to Web services. More particularly, the invention pertains to the deployment of Web services into a run-time environment.

BACKGROUND OF THE INVENTION

The Internet is a vast collection of computing resources, interconnected as a network, from sites around the world. It is used every day by millions of people. The World Wide Web (referred to herein as the "Web") is that portion of the Internet that uses the HyperText Transfer Protocol (HTTP) as a protocol for exchanging messages.

A user working in a Web environment will have software running on his or her computer to allow him or her to create and send requests for information, and to see the results. These functions are typically combined in a software package that is referred to as a "Web browser", or "browser". The HTTP communications protocol uses a request/response paradigm, where the electronic messages sent between communicating computers can be categorized as either requests for information or responses to those requests. After the user has created a request using the browser, the request message is sent out into the Internet for processing. The target of the request message is one of the interconnected computers in the Internet network. That computer will receive the message, attempt to find the data satisfying the user's request, format that data for display with the user's browser, and return the formatted response to the browser software running on the user's computer.

Content on the Internet typically is stored on server computers in individual files in the form of HTML pages, containing displayable information. HTML (HyperText Markup Language) is a Web content formatting language specifically designed for a distributed network such as the Internet. Web browser software is designed to issue page requests in the form of URLs (Universal Resource Locators). A URL essentially is an address of a file that is accessible through the Internet. The URL includes the name of the file that is being requested and the IP (Internet Protocol) address of the server on which it is to be found. The file is identified as a HTML type file by its extension, usually .htm or .html.

Web services is a term applied to application logic or application software modules that can be exposed to and shared with others over the Internet via a standardized interface mechanism. The Web services concept can be considered an extension of the exchange of files containing displayable information, i.e., Web pages, paradigm to exchange of other types of information between nodes of a network, i.e., machine-to-machine, or business-to-business interfaces.

Currently, the Web services landscape is an evolving collection of inter-related standards and implementations. Presently, there is no system for aggregating all of the necessary information to fully describe, deploy and manage the life cycle of a Web service. Web Service Description Language (WSDL) is an XML-based language that is central to the future development of the Web services paradigm. WSDL is used to describe the services a business offers and to provide a way for others to access those services via the Web (or any other network).

The UDDI initiative is an XML-based registry standard by which businesses list themselves and the Web services they offer on the Internet. WSDL is one approach to describing such Web services. A key goal of the UDDI initiative is to enable companies to find each other and each other's Web services on the Internet and to make their computer systems inter-operable with each other in order to facilitate electronic commerce. The UDDI initiative allows businesses to list information about themselves, e.g., name, location, and/or the Web services they offer.

In today's Internet environment, there are many ways to discover information about a Web service in addition to the UDDI scheme. For instance, users seeking Web services can search not only the UDDI public registry but also Web pages such as Xmethods (www.xmethods.com) that contain information about where to find Web services on the Web. Further, users may simply know the URL of the service information.

Even further, Web service information may be in many formats. For instance, one such format is WSDL (Web Service Definition Language). However, the UDDI registry does not necessarily utilize WSDL for information typically contained inside the WSDL implementation documents.

Other scenarios for representing a Web service include: (1) an environment specific deployment descriptor such as HTTP://www.foo.com/mydeploymentdescriptor.xml, (2) a UDDI service key such as D2033110-3AAF-11D5-80DC-002035229C64, (3) a WSIL (Web Service Inspection Language) document, such as HTTP://www.foo.com/service.wsil, (4) an HTML (Hypertext Markup Language) document such as HTTP://www.foo.com/services.html containing WSIL meta tags, (5) a filename of a serialized object representing a deployment descriptor, such as deploymentDesc.ser, or (6) a deployment object in the implementation language.

Moreover, the way in which a Web service is to be deployed can depend on the perspective of the entity requesting the Web service. For example, the way in which a Web service is deployed may depend on whether the accessing entity is deploying a proxy to the Web service or deploying a Web service that it will directly host.

Given so many ways of representing deployment information for a Web service, it is extremely difficult for developers building a Web services framework to keep deployment of services simple.

Accordingly, it is an object of the present invention to provide a framework that simplifies discovery and deployment of Web services.

It is another object of the present invention to provide a method and apparatus for deploying Web services into a run-time environment.

SUMMARY OF THE INVENTION

In accordance with the invention, a user of Web services executes a simple, but extensible, deployment manager API (Application Program Interface) that, upon receipt of a potential Web service deployment artifact (e.g., a WSDL document, a WSIL document, an XML document, an XML object, etc.), attempts to determine the particular deployment strategy for the Web service and then deploy the Web service using the determined strategy. This scheme relieves software developers of the burden of figuring out ways to collect information about Web services and deploy Web services. In addition, the API is extensible in that it allows Web service developers to create their own deployment strategies and corresponding deployment identifiers, including specific deployment descriptors, and then register them with the deployment manager API so that the API can deploy Web services using new deployment identifiers and deployment strategies.

More particularly, the deployment manager API stores a plurality of different deployment strategies and corresponding deployment identifiers. When the deployment manager API receives a deployment artifact, it checks if it is a known deployment descriptor object that is registered with it, and, if so, runs the corresponding deployment strategy to deploy the Web service.

If the artifact is not a recognized deployment descriptor object, it then tries a second scheme in which it assumes that the artifact is a URL or URI character string of a resource and attempts to parse the artifact to determine the extension of the provided resource (e.g., HTML, WSIL, WSDL, XML). If it determines and recognizes the extension, it attempts to deploy the Web service utilizing the deployment strategy that it has registered as corresponding to that extension (i.e., artifact type). For example, if the suffix is WSDL, it assumes that the provided resource is a WSDL implementation document and attempts to deploy the Web service in accordance with that well known scheme. As another example, if the suffix is XML, it parses the XML document looking for a reference to a WSDL document and, if it finds one, it retrieves the WSDL document and deploys the Web service accordingly.

If these attempts to determine a deployment strategy are unsuccessful, it tries a default deployment strategy in which it attempts to parse the provided resource to create a Document Object Model (DOM) and then query the DOM's namespace for an indication of the appropriate type of Web service deployment strategy. The namespace may, for instance, contain a URL or URI comprising a recognized extension. Accordingly, the potential deployment strategies in this default deployment strategy may be the same ones as for the above-mentioned attempt to determine a deployment strategy by use of the URL extension.

DETAILED DESCRIPTION OF THE INVENTION

Figure 1:
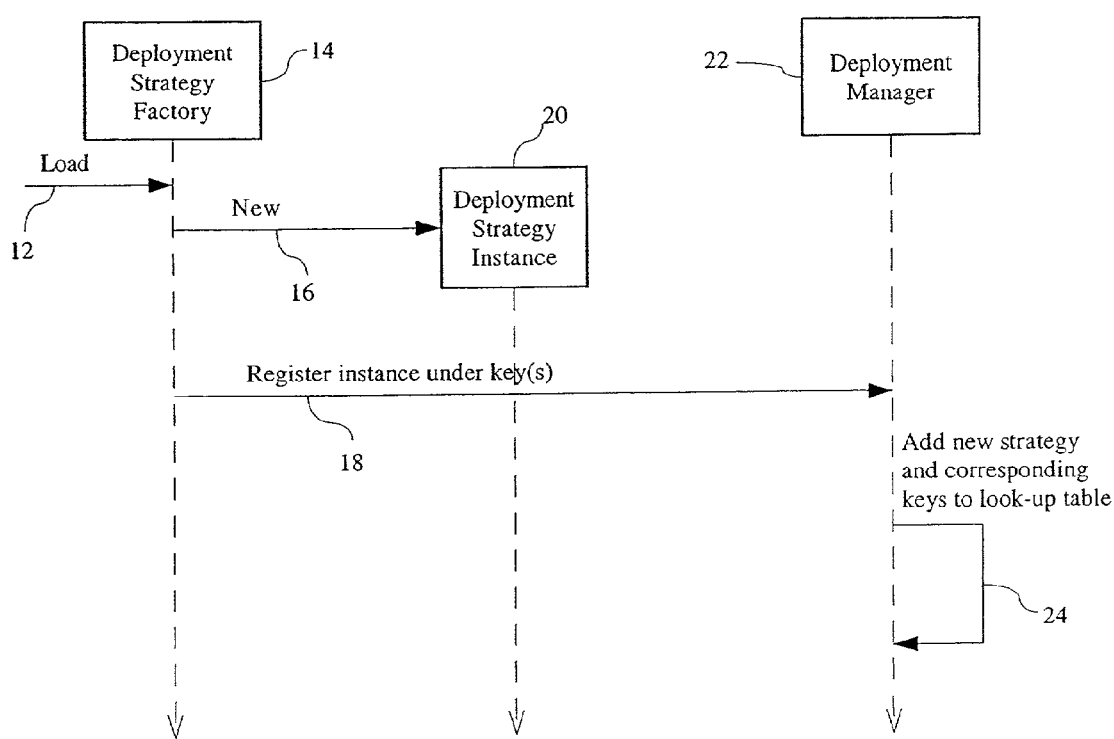
FIG. 1 is a Universal Markup Language flow diagram illustrating request and response flow in connection with registration of a new deployment strategy with a deployment manager in accordance with the present invention.

A user of Web services at a node of a network has many options for discovering and deploying Web services found at other nodes of the network. For instance, on the Web, users seeking Web services can search a public registry of Web services such as UDDI or DISCO. Alternately, Web pages such as www.XMethods.com are HTML documents containing lists of (and hyperlinks to) Web services. Even further, a user simply may know the URL (Uniform Resource Locator) of the Web service information and, thus, be able to access it directly.

Furthermore, the Web service information can be in many formats, such as a WSDL document, a WSIL document, WSIL or WSDL referenced from an XML or HTML document, a UDDI service key, a file containing a serialized object representing a Web service deployment descriptor, a deployment object in the implementation language, an HTML page with metatags for WSIL, or an environment-specific deployment descriptor. The term "artifact" or "deployment artifact" is used in this specification to denote the manner in which a Web service is presented to a potential user of the Web service. Thus, in the terminology of this specification, all of the formats listed in this paragraph are deployment artifacts of the corresponding Web services represented by them.

In accordance with the invention, the user's computing device (hereinafter machine) is equipped with a very simple API (Application Program Interface), herein termed the deployment manager API, that has a plurality of deployment strategies for deploying Web services. As a practical matter, the invention will likely be incorporated into a larger software package, such as a software application development package for creating business applications. For instance, the assignee of the present application produces an enterprise application development software package under the name VisualAge®® Smalltalk. It is a software tool that enables software developers to create highly portable, scalable, multi-tier business applications using pure object-oriented technology. An API in accordance with the present invention might be incorporated into such a software product. The overall software product preferably includes mechanisms for seeking out Web services and downloading resources corresponding to discovered Web services. This API can be incorporated as the front end of the software package that receives the Web service deployment artifacts.

The deployment manager API stores a plurality of different deployment strategies that it can use to deploy discovered Web services. It further stores a table or other data structure (hereinafter termed a key) correlating each deployment strategy to one or more Web service deployment identifiers for which it is the appropriate strategy for deploying a Web service that presents itself to the API via an artifact comprising that identifier.

The API is extensible in that any qualified user can register with the API a Web service deployment identifier and a corresponding strategy for deploying the associated Web services. The identifier and/or strategy may be unique to a single Web service or may correspond to a plurality of Web services having the same deployment strategy.

A Web service deployment identifier may be any characteristic that can be derived from a Web service deployment artifact and that can be used to associate an artifact with a deployment strategy. Thus, an identifier can be virtually anything, such as a particular filename extension (e.g., .wsdl, .wsil, .xml) as will be discussed in more detail below, a particular filename, a UDDI service key, an environment-specific Web service deployment descriptor, a deployment object in the implementation language corresponding to a Web service, and a filename of a serialized object representing a deployment descriptor. In fact, the identifier may be any filename having certain identifiable characteristics (e.g., any filename for which the first six characters are ws1234) so that a plurality of Web services can use the same identifier and, hence, the same deployment strategy.

In any event, when the deployment manager API receives a deployment artifact, it first checks the key to determine if it is a recognized Web service deployment object that is registered with it. If so, it runs the corresponding deployment strategy to deploy the Web service. This step handles the scenario where the user is deploying a pre-instantiated object, e.g., a deployment descriptor such as HTTP://www.foo.com/mydeploymentdescriptor.xml.

If the artifact is not a recognized deployment object, it then tries a second scheme for determining how to deploy the Web service. Specifically, in one preferred embodiment, it assumes that the artifact is a URL or URI character string and it attempts to parse the artifact to determine the filename extension of the provided resource (e.g., HTML, WSIL, WSDL, XML). Alternately, instead of simply assuming that the artifact is a URL, it may observe the artifact and attempt to determine if it has characteristics that suggest whether it is or is not a URL character string. For instance, it may check if the artifact is a character string having between 10 and 25 characters.

If the artifact, in fact, either appears to be or is assumed to be a URL, the API looks at its filename extension to determine if it is an extension it has registered against a particular Web service deployment strategy. For instance, if a URL ends in .wsdl, it is likely a Web Service Description Language document. Accordingly, the API will try to deploy the Web service using a WSDL strategy. WSDL is a language specifically developed for describing a Web service. The WSDL framework includes a strategy for parsing a WSDL document to create all the necessary language constructs, such as instantiating a service object and/or a service proxy object.

Several other Web service deployment strategies are known, each having associated deployment artifact formats, e.g., having specific filename extensions and deployment strategies that correspond to those formats. Accordingly, the API would be equipped with strategies for deploying Web services represented in those formats and the aforementioned table would correlate those strategies to the corresponding extension(s). Such schemes include, for instance, WSIL (Web Service Inspection Language), for which corresponding URLs would normally have a .wsil filename extension at the end of the URL. WSIL has an associated strategy for deploying a Web service represented in that format. For example, if the artifact is a WSIL document, that document likely contains a reference to a WSDL implementation document and provides a view into the WSDL interface document. The corresponding strategy would use that information to create the necessary proxy information for deploying the corresponding Web service. As another alternative, it is known to represent Web services with WSIL metatags embedded in HTML pages. Accordingly, the strategy corresponding to URLs having the suffix HTM or HTML would include parsing the HTML page to find any WSIL metatags and then deploying the Web service discovered in this manner using the WSIL deployment strategy.

As an even further example, if the extension is XML, the API parses the XML document looking for a referenced WSDL document and, if it finds one, retrieves the WSDL document and deploys the Web service using the strategy corresponding to WSDL documents.

As another example, if the artifact is an identifier key for a registry such as UDDI, this invention transparently makes a query to the registry and retrieves the necessary information in order to instantiate the service object and then invoke behavior on it.

If these two attempts to determine a deployment strategy fail, i.e., if the deployment artifact (1) is not a recognized deployment object, and (2) is not a URL with a recognizable extension, or (3) is a URL with a recognized extension, but the corresponding deployment strategy that was invoked based on the determined extension failed nevertheless, the deployment manager API tries a default deployment strategy. The default deployment strategy may be any reasonable strategy.

In a preferred embodiment of the invention, the default deployment strategy is called the "indeterminate strategy" and essentially still assumes that the artifact is a URL. It attempts to parse the provided resource to create an XML Document Object Model (DOM). If it is successful in parsing the document into a DOM, it attempts to extract the namespace URI of the DOM. If it is able to extract a namespace URI, it uses the URI as a key to check against the list of identifiers and corresponding strategies maintained in the deployment manager.

The DOM namespace hopefully will identify the artifact as WSIL, WSDL, XML, HTML, etc. For instance, the assignee of the present application typically uses internal XML deployment descriptors that have an unique namespace identifier that is simply an XML URI in the namespace of the DOM document. Thus, parsing a file into a DOM document provides another chance of determining the type of the artifact.

If the namespace is recognized, then it attempts to deploy the Web service using the deployment strategy corresponding to that namespace. The potential deployment strategies in this process may be the same ones as for the aforementioned attempt at determining a deployment strategy based on filename extension.

As noted above, the API is extensible in that additional deployment strategies (and additional corresponding deployment identifiers) can be added by users. For instance, users can identify additional unique filename extensions and deployment strategies that correspond to them. The corresponding strategies preferably, but not necessarily, are known, pre-existing strategies. However, a user may develop its own deployment strategy and that would also need to be incorporated into the framework. User-developed strategies (and the deployment artifacts that correspond to them) need not be deployment descriptors or unique filename extensions and need not fit within any of the three specific schemes discussed above. Users may be allowed to invent strategies and corresponding identifiers that do not fall into any of the three general steps discussed above, but instead add new strategy determination schemes to the overall deployment manager API algorithm.

A user may register a proprietary or custom strategy with the API in several different ways. In one technique, a user creates a class having any name of his or her choosing. The Web service application is then loaded into the software product's (e.g., Smalltalk's) image. At that time, the software issues a call back indicating that the class has been loaded. The user can then instantiate that class and register it against the corresponding deployment strategy.

FIG. 1 is a Universal Markup Language flow diagram illustrating one example of a request and response flow in connection with registration of a new deployment strategy with a deployment manager in accordance with the present invention. First, as shown at 12, the user loads the new strategy and its keys into a deployment strategy factory 14 which stores and maintains all of the registered deployment strategies. The deployment strategy factory 14 then creates (16) an instance of the new strategy 20. It also registers (20) the instance along with its key or keys with the deployment manager 22. The deployment manager then adds the strategy and its corresponding key(s) to the registry 24. The registry may be a simple look up table correlating the keys to the corresponding strategies. The deployment manager is now ready to deploy a Web service bearing the appropriate key using the newly registered strategy.

Figure 2:
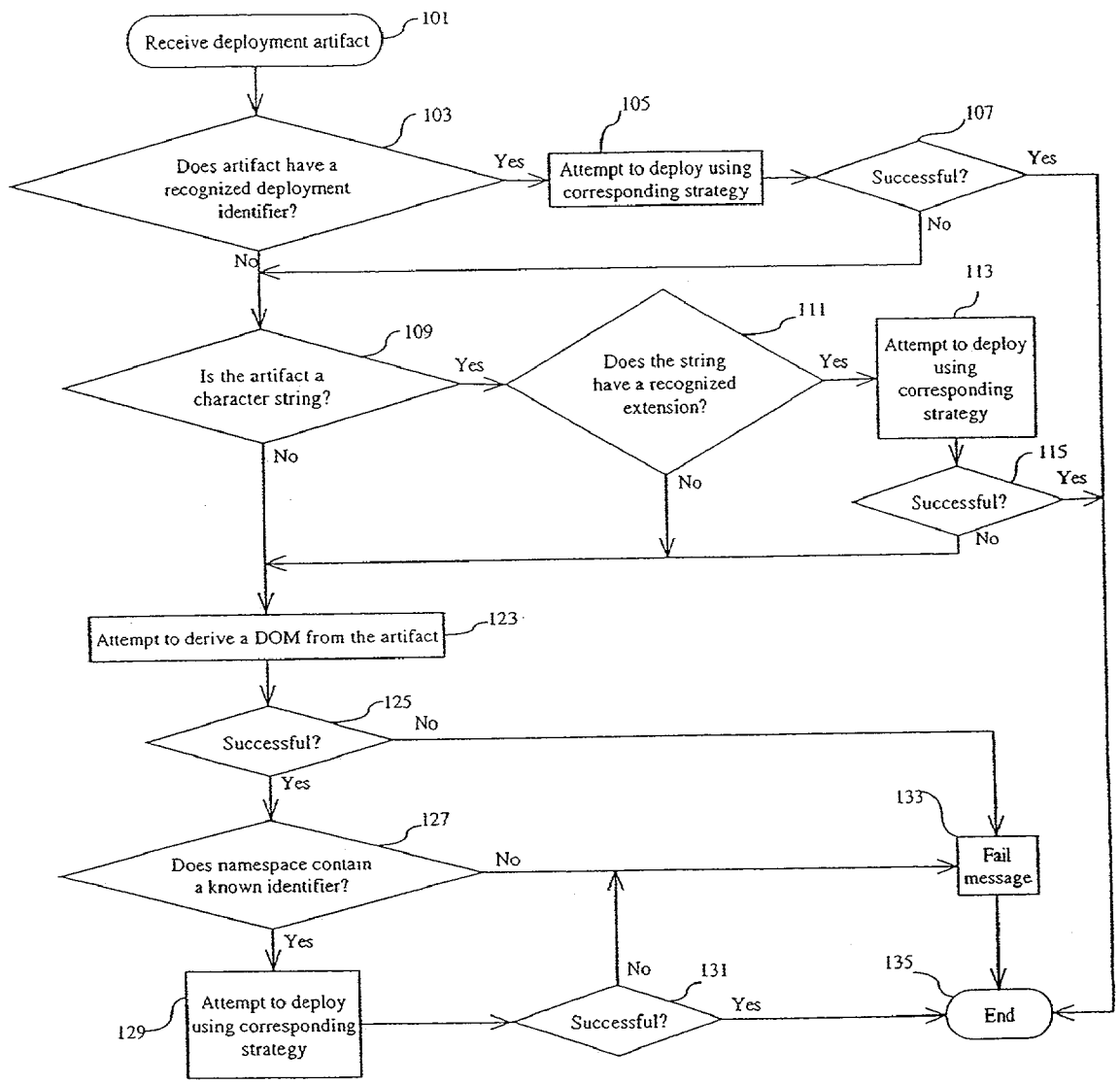
FIG. 2 is a flow diagram illustrating process flow of a deployment manager API in accordance with an embodiment of the present invention.

FIG. 2 is a flow diagram illustrating the flow of processing for determining a strategy and deploying a Web service generally in accordance with the embodiment of the invention described above. The process starts at step 101 when the API receives a deployment artifact. In step 103, the API determines whether the artifact has a recognized deployment descriptor corresponding to any of the deployment strategies registered with the API. If so, flow proceeds to step 105 in which it attempts to deploy the Web service using the strategy corresponding to the recognized deployment descriptor. In step 107, the API determines if the deployment was successful. If so, the process ends successfully at step 135. If not, flow proceeds to step 109.

In step 109, the API attempts to determine if the artifact is a character string. Alternately, this step may be skipped, i.e., the API may simply assume that, if the artifact is not a recognized deployment identifier, it is a character string and proceed to step 111. In step 111, the API attempts to determine if the string has a recognized filename extension. If it does, flow proceeds to step 113 in which it attempts to deploy the Web service using the registered strategy corresponding to that extension. As shown in step 115, if the Web services deploy successfully, the process is over and the flow proceeds to the end at step 135. If (1) the artifact is not a character string (as determined in step 109, (2) the string does not have a recognized extension (as determined in step 111), or (3) it is a string with a recognized extension, but the attempt to deploy the Web service using the corresponding strategy fails (step 115), flow proceeds instead to step 123.

In step 123, the API attempts to derive a DOM from the artifact. As shown in step 125, if unsuccessful, flow proceeds to step 133 in which a fail message is generated indicating that the API could not deploy the Web service and then the process ends at step 135. However, if a DOM is derived from the artifact, flow instead proceeds to step 127.

In step 127, the API determines if the DOM namespace contains a known identifier. If not, flow again proceeds to step 133 in which a fail message is generated before the process ends at step 135. However, if the namespace does contain a known identifier, flow proceeds to step 129. In step 129, the API attempts to deploy the Web service using the strategy corresponding to the known identifier.

As shown in step 131, if this is successful, the process ends successfully. If it is not successful, flow again proceeds to step 133 in which a fail message is generated before the process ends at step 135.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method of deploying a Web service, said method comprising the steps of:

maintaining a key in a memory device correlating each one of a plurality of Web service deployment artifact types to a corresponding one of a plurality of Web service deployment strategies;

receiving a Web service deployment artifact associated with a Web service;

determining if said received artifact is a Web service deployment object having a corresponding deployment strategy as set forth in said key;

if said received artifact is a Web service deployment object having a corresponding deployment strategy in said key, using said deployment strategy corresponding to said artifact type of said received artifact to attempt to deploy said associated Web service;

if said received artifact is not a Web service deployment object having a corresponding deployment strategy set forth in said key, determining if said received artifact is a character string containing an extension having a corresponding deployment strategy as set forth in said key;

if said received artifact is of an artifact type in said key, using said deployment strategy corresponding to said artifact type of said received artifact to attempt to deploy said associated Web service; and if said received artifact is not of a Web service deployment object having a corresponding deployment strategy set forth in said key and is not a character string containing an extension having a corresponding deployment strategy as set forth in said key, attempting to parse said deployment artifact into an XML Document Object Model (DOM);

if said deployment artifact is parsed into a DOM;

determining a namespace of said DOM; and determining if said namespace is a character string having a corresponding deployment strategy as set forth in said maintained data.

2. The method of claim 1 wherein said maintaining step further comprises the step of:

adding to said data Web service deployment identifiers and corresponding Web service deployment strategies.

3. A computer readable product embodied on computer readable media readable by a computing device for determining an appropriate deployment strategy for and deploying a Web service, said product comprising:

computer executable instructions for maintaining a key correlating each one of a plurality of Web service deployment artifact types to a corresponding one of a plurality of Web service deployment strategies;

computer executable instructions for receiving a Web service deployment artifact associated with a Web service;

computer executable instructions for determining if said received artifact is a Web service deployment descriptor having a corresponding deployment strategy as set forth in said key;

computer executable instructions for, if said received artifact is a Web service deployment object having a corresponding deployment strategy in said key, using said deployment strategy corresponding to said artifact type of said received artifact to attempt to deploy said associated Web service;

computer executable instructions for, if said received artifact is not a Web service deployment object having a corresponding deployment strategy set forth in said key, determining if said received artifact is a character string containing an extension having a corresponding deployment strategy as set forth in said key;

computer executable instructions for, if said received artifact is of an artifact type in said key, using said deployment strategy corresponding to said artifact type of said received artifact to attempt to deploy said associated Web service;

computer executable instructions for, if said received artifact is not of a Web service deployment object having a corresponding deployment strategy set forth in said key and is not a character string containing an extension having a corresponding deployment strategy as set forth in said key, attempting to parse said deployment artifact into an XML Document Object Model (DOM); and computer executable instructions for, if said deployment artifact is parsed into a DOM;

determining a namespace of said DOM; and determining if said namespace is a character string having a corresponding deployment strategy as set forth in said maintained data.

4. The computer readable product of claim 3 wherein the computer executable instructions for determining comprises instructions for adding to said data Web service deployment identifiers and corresponding Web service deployment strategies.

5. The computer readable product of claim 3 wherein said computer readable product comprises an Application Program Interface software module.

* * * * *